(12) United States Patent
Maeda

(10) Patent No.: US 12,424,866 B2
(45) Date of Patent: Sep. 23, 2025

(54) POWER CONVERSION SYSTEM

(71) Applicant: TOYOTA JIDOSHA KABUSHIKI KAISHA, Toyota (JP)

(72) Inventor: Hideki Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 792 days.

(21) Appl. No.: 17/584,603

(22) Filed: Jan. 26, 2022

(65) Prior Publication Data

US 2022/0278544 A1 Sep. 1, 2022

(30) Foreign Application Priority Data

Feb. 26, 2021 (JP) .................................. 2021-029773

(51) Int. Cl.
| | | |
|---|---|---|
| H02M 1/32 | (2007.01) | |
| B60L 15/20 | (2006.01) | |
| B60L 53/20 | (2019.01) | |
| B60L 53/62 | (2019.01) | |
| H02J 7/00 | (2006.01) | |
| H02M 1/00 | (2006.01) | |
| H02M 1/14 | (2006.01) | |
| H02M 3/158 | (2006.01) | |

(Continued)

(52) U.S. Cl.
CPC ........ *H02J 7/007192* (2020.01); *B60L 15/20* (2013.01); *B60L 53/20* (2019.02); *B60L 53/62* (2019.02); *H02M 1/0009* (2021.05); *H02M 1/143* (2013.01); *H02M 1/327* (2021.05); *H02M 3/158* (2013.01); *H02M 7/53871* (2013.01); *H02P 27/08* (2013.01); *H02J 2207/20* (2020.01)

(58) Field of Classification Search
CPC . H02J 7/007192; H02J 2207/20; B60L 15/20; B60L 53/20; B60L 53/62; H02M 1/0009; H02M 1/143; H02M 1/327; H02M 3/158; H02M 7/53871; H02P 27/08
USPC .......................... 320/134, 136; 307/9.1, 10.1
See application file for complete search history.

(56) References Cited

U.S. PATENT DOCUMENTS

| | | | |
|---|---|---|---|
| 8,793,044 B2 * | 7/2014 | Miyamoto | ............ B60W 10/30 417/44.1 |
| 2006/0114702 A1 * | 6/2006 | Yamada | .................. B60L 50/16 363/132 |
| 2015/0108929 A1 | 4/2015 | Nobe et al. | |

(Continued)

FOREIGN PATENT DOCUMENTS

| | | |
|---|---|---|
| CN | 104736981 A | 6/2015 |
| JP | 2009303329 A * | 12/2009 |

(Continued)

*Primary Examiner* — Rexford N Barnie
(74) *Attorney, Agent, or Firm* — Oliff PLC

(57) ABSTRACT

A power conversion system includes a converter, a current sensor, and a motor ECU. The converter is configured to boost a voltage by operating at a set carrier frequency. The current sensor detects a current flowing through the converter. The motor ECU executes control for protecting the converter. The motor ECU estimates a temperature rise amount of the converter according to at least one of the carrier frequency and a voltage ratio before and after boosting the converter, and a detected value of the current sensor, and executes control for suppressing the current flowing through the converter in a case where an integrated value of the temperature rise amount reaches a threshold.

6 Claims, 9 Drawing Sheets

(51) Int. Cl.
*H02M 7/5387* (2007.01)
*H02P 27/08* (2006.01)

(56) References Cited

U.S. PATENT DOCUMENTS

| | | | | |
|---|---|---|---|---|
| 2015/0211938 A1* | 7/2015 | Imakiire | ............. | G01K 7/16 |
| | | | | 702/133 |
| 2016/0152150 A1 | 6/2016 | Taguchi et al. | | |
| 2016/0347185 A1* | 12/2016 | Lee | ............. | B60L 50/15 |
| 2018/0254730 A1* | 9/2018 | Yamamoto | ............. | H02P 21/13 |

FOREIGN PATENT DOCUMENTS

| | | |
|---|---|---|
| JP | 2011-049032 A | 3/2011 |
| JP | 2011-229247 A | 11/2011 |
| JP | 2013-048513 A | 3/2013 |
| JP | 2013-067227 A | 4/2013 |
| JP | 2015-080343 A | 4/2015 |
| JP | 2016-111730 A | 6/2016 |

* cited by examiner

FIG. 6

| IL | tTH $\left(\frac{VLa}{VHa}, fca\right)$ | $\Delta TC \left(\frac{VLa}{VHa}, fca\right)$ |
|---|---|---|
| IL1 | tTH11 | $\left(\frac{TS}{tTH11}\right) \times 100 \times \Delta TTH$ |
| IL2 | tTH21 | $\left(\frac{TS}{tTH21}\right) \times 100 \times \Delta TTH$ |
| IL3 | tTH31 | $\left(\frac{TS}{tTH31}\right) \times 100 \times \Delta TTH$ |
| .... | .... | .... |

605 — IL
610 — tTH $\left(\frac{VLa}{VHa}, fca\right)$
615 — $\Delta TC \left(\frac{VLa}{VHa}, fca\right)$ 600 $\left(\frac{VL}{VH} = \frac{VLa}{VHa}, fc=fca\right)$
620 $\left(\frac{VL}{VH} = \frac{VLb}{VHb}, fc=fcb\right)$
630 $\left(\frac{VL}{VH} = \frac{VLc}{VHc}, fc=fcc\right)$

POWER CONVERSION SYSTEM

CROSS-REFERENCE TO RELATED APPLICATION

This application claims priority to Japanese Patent Application No. 2021-029773 filed on Feb. 26, 2021, incorporated herein by reference in its entirety.

BACKGROUND

1. Technical Field

The present disclosure relates to a power conversion system, and more particularly to a power conversion system including a converter.

2. Description of Related Art

Japanese Unexamined Patent Application Publication No. 2011-049032 (JP 2011-049032 A) discloses a control system capable of protecting a converter. This control system includes a battery, a buck-boost converter circuit, a current sensor, and a control unit. The current sensor detects a current flowing through the buck-boost converter circuit. The control unit compares a squared integrated value of a detected value of the current sensor with a threshold for protecting the buck-boost converter circuit. When the integrated value is equal to or smaller than the threshold, the control unit performs a continuous control such that a battery temperature rises. On the other hand, when the integrated value is larger than the threshold, the control unit stops the control such that the battery temperature ceases to increase to protect the buck-boost converter circuit from overheating.

SUMMARY

The current flowing through the converter includes a ripple component in addition to a DC component. Even if the DC component is kept at the same magnitude, a temperature rise amount of the converter becomes larger as the ripple component becomes larger. Lots of current sensors may not be able to accurately detect the ripple component depending on their degree of detection accuracy. Therefore, in a case where the temperature rise amount of the converter is estimated according to the detected value of the current sensor for the purpose of protecting the converter from overheating, it is also likely that the temperature rise amount of the converter is estimated under the assumed condition that the ripple component is always at the maximum level with respect to the detected value of the current sensor. However, if protecting the converter from overheating is performed based on such an estimated temperature rise amount, the converter will be overprotected. The disclosure in JP 2011-049032 A does not particularly consider this problem.

The present disclosure provides a power conversion system including a converter, in which the converter is appropriately protected from overheating according to a detected value of a current sensor that detects a current flowing through the converter.

The power conversion system according to an aspect of the present disclosure includes a converter, a current sensor, and a control device. The converter boosts a voltage by operating at a set carrier frequency. The current sensor detects a current flowing through the converter. The control device executes control for protecting the converter. The control device estimates a temperature rise amount of the converter according to at least one of the carrier frequency and a voltage ratio before and after boosting the converter, and a detected value of the current sensor, and executes control for suppressing the current flowing through the converter in a case where an integrated value of the temperature rise amount reaches a threshold.

In the above configuration, the temperature rise amount of the converter is estimated based on at least one of the voltage ratio and the carrier frequency of the converter, both of which affect a ripple component, as well as the detected value of the current sensor. At least one of the voltage ratio and the carrier frequency of the converter is taken into account, thus protecting the converter from overheating may not be performed under the assumed condition that the ripple component is at the maximum level. Consequently, the converter can be adequately protected from overheating.

In the aspect, the power conversion system may further include a storage unit configured to store a predetermined correlation between the temperature rise amount, the detected value of the current sensor, and at least one of the voltage ratio and the carrier frequency. The control device may estimate the temperature rise amount according to the detected value of the current sensor, using the predetermined correlation and at least one of the voltage ratio and the carrier frequency.

In the above configuration, the temperature rise amount of the converter is estimated based on the correlation prepared in advance. Consequently, the power conversion system can have a streamlined configuration while the converter can be adequately protected from overheating.

In the aspect, the control device may set, in a case where the integrated value reaches the threshold, the carrier frequency to be higher than a carrier frequency immediately before the integrated value reaches the threshold.

In the above configuration, the carrier frequency of the converter is set to be higher, thus a ripple amplitude of the current flowing through the converter is reduced. Consequently, the temperature rise amount of the converter is reduced, and thus the converter can be protected from overheating.

In the aspect, the converter may be electrically connected between a power storage device and a load device. The control device may control the load device such that electric power input to and output from the power storage device is respectively limited to a charging upper limit and a discharging upper limit of the power storage device. The control device may also set, in a case where the integrated value reaches the threshold, the charging upper limit and the discharging upper limit to be lower than a charging upper limit and a discharging upper limit immediately before the integrated value reaches the threshold.

Accordingly, the current flowing through the converter is suppressed, and thus the temperature rise amount of the converter is reduced. Consequently, the converter can be protected from overheating.

With the aspect of the present disclosure, it is possible to provide the power conversion system including the converter, in which the converter is appropriately protected from overheating according to the detected value of the current sensor that detects the current flowing through the converter.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 6 is a diagram illustrating a table showing a correlation between the detected value of the current flowing through the reactor and a temperature rise amount of the converter;

DETAILED DESCRIPTION OF EMBODIMENTS

Figure 1:
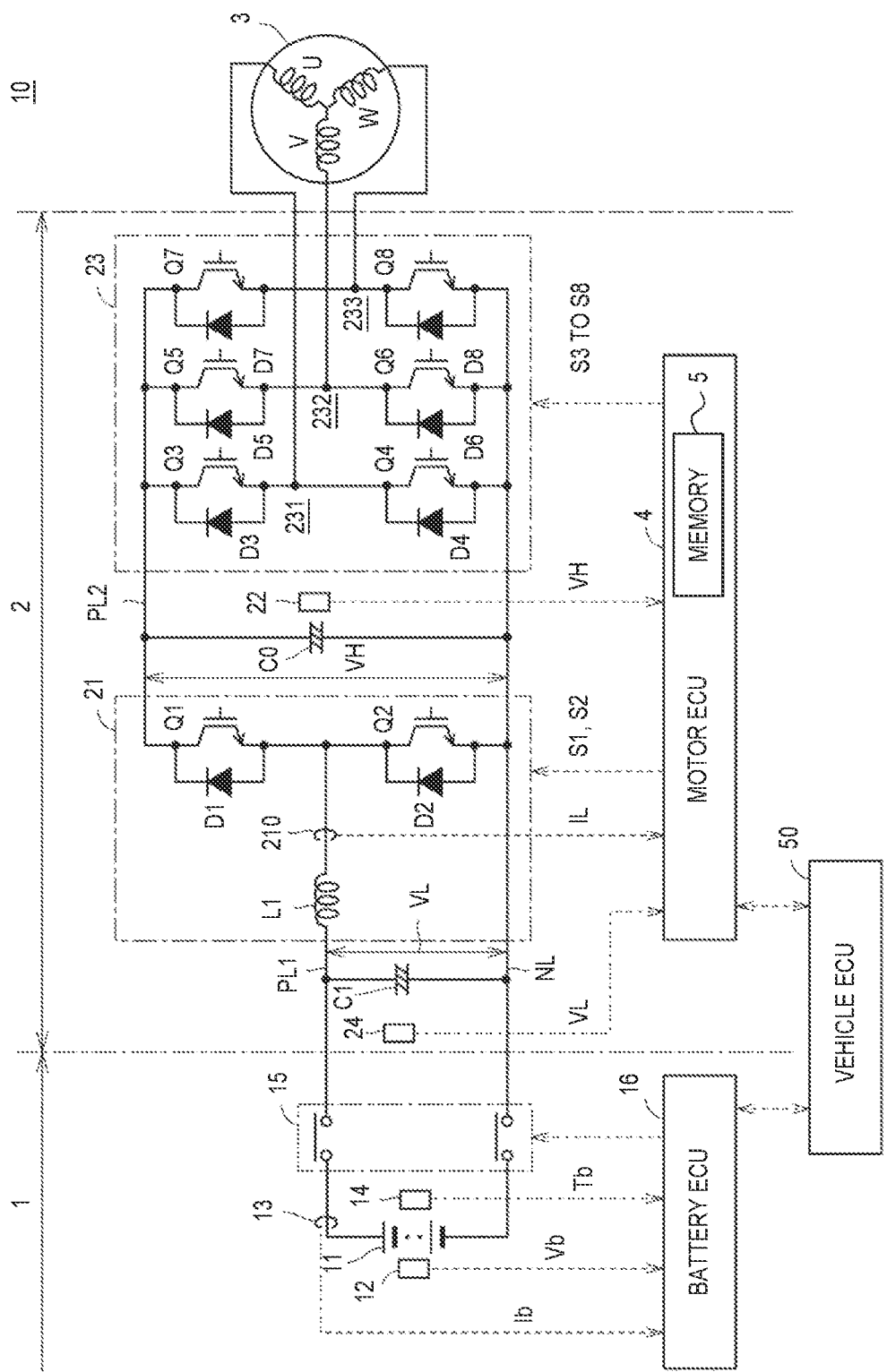
FIG. 1 is a diagram illustrating an overall configuration of a vehicle in which a power conversion system according to the present embodiment is adopted.

Hereinafter, the present embodiment will be described referring to drawings. In the drawings, the same or equivalent components will have the same reference signs assigned, and descriptions thereof will be omitted. In the following embodiment, a configuration of a vehicle shown as an example in which the power conversion system is adopted will be described, but the power conversion system of the present disclosure may be adopted in any other applications, not limited to the vehicle.

FIG. 1 is a diagram illustrating an overall configuration of the vehicle in which the power conversion system according to the present embodiment is adopted. In the present embodiment, a case where a vehicle 10 is an electric vehicle will be described as one example, but the vehicle 10 may be a hybrid vehicle further equipped with an internal combustion engine or may be a fuel cell vehicle further equipped with a fuel cell.

The vehicle 10 includes a battery pack 1, a power control unit (PCU) 2, a motor generator (MG) 3, and a vehicle electronic control unit (ECU) 50.

The battery pack 1 includes a battery 11, a voltage sensor 12, a current sensor 13, a temperature sensor 14, a system main relay (SMR) 15, and a battery ECU 16.

The battery 11 is a power storage device that can be charged and discharged. The battery 11 is a rechargeable secondary battery, for example, a lithium-ion battery, a nickel-metal hydride battery, or a lead storage battery. Instead of the battery 11, a power storage device configured by a power storage element such as an electric double layer capacitor may be used. The battery 11 supplies the PCU 2 with electric power for generating a driving force of wheels (not shown) of the vehicle 10. Further, the battery 11 is configured to store the electric power generated by the MG 3 (described later).

The voltage sensor 12 detects a voltage Vb of the battery 11. The current sensor 13 detects a current Ib input to and output from the battery 11. The temperature sensor 14 detects a temperature Tb of the battery 11. Each sensor outputs its detected value to the battery ECU 16.

The SMR 15 is provided between the battery 11 and a converter 21 (described later). The SMR 15 is turned on and off according to a command from the battery ECU 16.

The battery ECU 16 includes a processor such as a central processing unit (CPU), and a memory such as a read only memory (ROM) or a random access memory (RAM).

The battery ECU 16 monitors a state of the battery 11 and controls the SMR 15 based on, for example, a signal received from each sensor, as well as a program and a map stored in the memory. As an example, the battery ECU 16 calculates a state-of-charge (SOC) of the battery 11 based on, for example, the current Ib, the voltage Vb, and the temperature Tb of the battery 11, and the program and the map stored in the memory. The battery ECU 16 transmits the calculated SOC to a vehicle ECU 50 (described later).

The PCU 2 includes a positive electrode line PL1, a negative electrode line NL, a capacitor C1, a converter 21, a positive electrode line PL2, a capacitor C0, voltage sensors 22 and 24, an inverter 23, and a motor ECU 4.

The positive electrode line PL1 electrically connects a positive electrode of the battery 11 and a high potential end of the converter 21 (described later). The negative electrode line NL electrically connects a negative electrode of the battery 11 and a low potential end of the converter 21. A voltage VL is a voltage between the positive electrode line PL1 and the negative electrode line NL.

The capacitor C1 is connected between the positive electrode line PL1 and the negative electrode line NL. The capacitor C1 smooths the voltage between the positive electrode line PL1 and the negative electrode line NL.

The voltage sensor 24 detects the voltage VL, which is a voltage across the capacitor C1, and outputs a detected value to the motor ECU 4.

The converter 21 is a boost chopper circuit and includes a reactor L1, a current sensor 210, switching elements Q1 and Q2, and diodes D1 and D2.

The reactor L1 is electrically connected between the positive electrode of the battery 11 and an intermediate point (connection node) between the switching element Q1 and the switching element Q2.

The current sensor 210 detects a current IL flowing through the reactor L1 and outputs a detected value to the motor ECU 4. The current sensor 210 cannot accurately detect a ripple component of the current IL. In the present embodiment, the current sensor 210 outputs a value corresponding to the average of the maximum peak value and the minimum peak value of the ripple component of the current IL, as a detected value.

The switching elements Q1 and Q2 are connected in series between the positive electrode line PL2 and the negative electrode line NL. The switching elements Q1 and Q2 are respectively switched (turned on/off) according to driving signals S1 and S2 from the motor ECU 4. The switching elements Q1 and Q2 are, for example, insulated gate bipolar transistors (IGBTs) or metal oxide semiconductor field effect transistors (MOSFETs).

The diodes D1 and D2 are respectively connected to the switching elements Q1 and Q2 in antiparallel.

The converter 21 is controlled by the motor ECU 4 (described later) such that the switching elements Q1 and Q2 are switched. The converter 21 is configured to boost the voltage VL to output a boosted voltage VH as operated at the set carrier frequency.

In the converter 21, a voltage ratio (VL/VH) between the voltage VH and the voltage VL (i.e., the voltage ratio before and after boosting) is controlled by an on-period ratio (duty ratio) of the switching elements Q1 and Q2 to a switching cycle (carrier cycle) of the converter 21. Hereinafter, the voltage ratio (VL/VH) is referred to as a "step-up ratio". The details of the control executed by the converter 21 will be described later.

The positive electrode line PL2 electrically connects the high potential end of the converter 21 and a high potential end of an inverter 23 (described later). The negative electrode line NL electrically connects the low potential end of the converter 21 and a low potential end of the inverter 23 (described later).

The capacitor C0 is connected between the positive electrode line PL2 and the negative electrode line NL to smooth the voltage therebetween.

The voltage sensor 22 detects the voltage VH, which is a voltage across the capacitor C0, and outputs a detected value to the motor ECU 4.

The inverter 23 includes a U-phase arm 231, a V-phase arm 232, and a W-phase arm 233. The U-phase arm 231 includes switching elements Q3 and Q4, and diodes D3 and D4, which are respectively connected to the switching elements Q3 and Q4 in antiparallel. The V-phase arm 232 includes switching elements Q5 and Q6, and diodes D5 and D6, which are respectively connected to the switching elements Q5 and Q6 in antiparallel. The W-phase arm 233 includes switching elements Q7 and Q8, and diodes D7 and D8, which are respectively connected to the switching elements Q7 and Q8 in antiparallel.

The switching elements Q3 to Q8 are respectively switched (turned on/off) according to driving signals S3 to S8 from the motor ECU 4.

The inverter 23 converts DC power output from the converter 21 into AC power by switching the switching elements Q3 to Q8, and outputs the converted AC power to MG 3. On the other hand, when regenerative braking of the vehicle 10 is performed, the inverter 23 converts AC power generated by the MG 3 into DC power and outputs the DC power to the converter 21. The DC power output to the converter 21 is stepped down according to the step-up ratio (VL/VH) of the converter 21 and then stored in the battery 11.

The MG 3 is shown as one example of the load device, which is a three-phase permanent magnet synchronous motor. In the MG 3, ends of three coils, i.e., U-phase, V-phase, and W-phase coils, are connected to a neutral point. The other ends of the U-phase, V-phase, and W-phase coils are respectively connected to intermediate points of the U-phase arm 231, the V-phase arm 232, and the W-phase arm 233. An output torque of the MG 3 is transmitted to a drive wheel through a power transmission gear (neither of them is shown), whereby the vehicle 10 travels. Further, the MG 3 generates electric power by a rotational force of the drive wheel during the regenerative braking of the vehicle 10.

Similar to the battery ECU 16, the motor ECU 4 includes a processor (not shown) such as a CPU, and a memory 5 configured by, for example, a ROM and a RAM. The motor ECU 4 is configured to establish communication with the vehicle ECU 50 (described later), so as to exchange various data and signals with each other.

The motor ECU 4 controls the converter 21 and the inverter 23 with pulse width modulation (PWM) based on the signals received from each sensor, as well as the program and the map stored in the memory 5. The motor ECU 4 sets, for example, a carrier frequency for PWM control of the converter 21, and controls the voltage VH boosted by the converter 21.

The vehicle ECU 50 is a higher-level ECU that controls the entire vehicle 10 based on signals output from various sensors of the vehicle 10. The vehicle ECU 50 controls, for example, a charging upper limit Win and a discharging upper limit Wout of the battery 11 based on the SOC of the battery 11 transmitted from the battery ECU 16. The vehicle ECU 50 controls a torque of the MG 3 such that the input power and the output power of the battery 11 are respectively limited to the charging upper limit Win and the discharging upper limit Wout.

The current flowing through the converter 21 includes a ripple component in addition to a DC component. The ripple component is generated due to switching operations by the switching elements Q1 and Q2. Even if the DC component of the current flowing through the converter 21 is kept at the same magnitude, a temperature rise amount of the converter 21 becomes larger as the ripple component becomes larger. The current sensor 210 cannot accurately detect the ripple component. Therefore, in a case where the temperature rise amount of the converter 21 is estimated according to the detected value of the current sensor 210 for the purpose of protecting the converter 21 from overheating, it is also likely that the temperature rise amount of the converter 21 is estimated under the assumed condition that the ripple component is always at the maximum level with respect to the detected value of the current sensor 210. However, if control of protecting the converter 21 from overheating is executed based on such an estimated temperature rise amount, the converter 21 will be overprotected.

In consideration of the problems stated above, the inventors focused on the fact that an amplitude of the ripple component (hereinafter, also referred to as a "ripple amplitude") of the current flowing through the converter 21 varies according to the step-up ratio (VL/VH) of the converter 21 and the carrier frequency of the PWM control of the converter 21.

Therefore, the motor ECU 4 according to the present embodiment estimates the temperature rise amount of the converter 21 according to the step-up ratio (VL/VH) of the converter 21, the carrier frequency of the converter 21, and the detected value of the current flowing through the converter 21. Therefore, it is not necessary to overestimate the temperature rise amount under the assumed condition that the ripple component is always at the maximum level with respect to the detected value obtained by the current sensor 210. When an integrated value of the temperature rise amount estimated as described above reaches a threshold, the current flowing through the converter 21 is controlled to be suppressed. Hereinafter, the control is also referred to as "converter current suppression control". Specific examples of the converter current suppression control will be described later.

Hereinafter, the control of the motor ECU 4 according to the present embodiment will be described in more detail. The current IL is employed as one example of the current flowing through the converter 21 in the following description.

It is known that a ripple amplitude ILpp (peak-peak value) of the current IL is a function of the voltage VL and voltage VH of the converter 21 with a carrier frequency fc of the converter 21 as shown in the following equation (1).

$$IL_{pp} = (VL/L) \times (1/fc) \times (VH-VL)/VH \quad (1)$$

The equation (1) is modified as follows with respect to the step-up ratio (VL/VH=k).

$$IL_{pp} = (-1/L) \times (1/fc) \times \{(k-½)^2 - ¼\} \times VH \quad (2)$$

Figure 2:
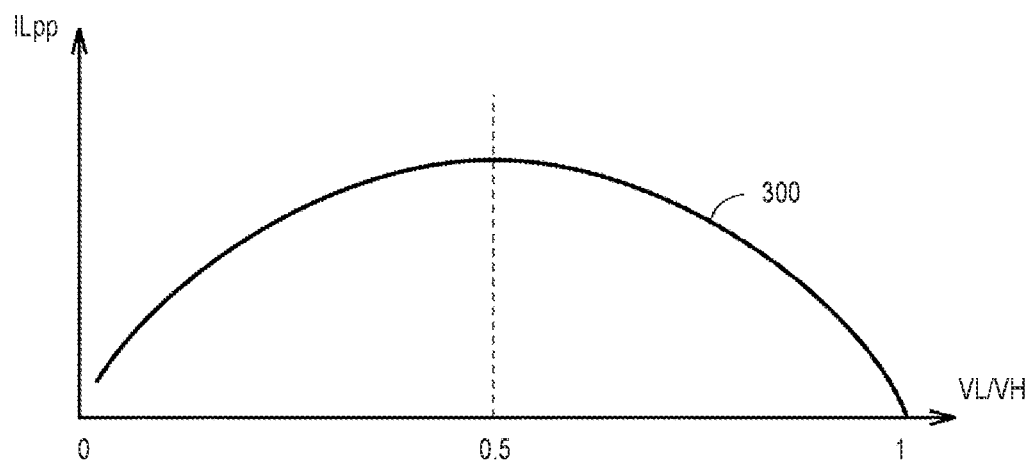
FIG. 2 is a diagram illustrating a correlation between a ripple amplitude of a current flowing through a reactor and a step-up ratio.

Therefore, as denoted by line 300 in FIG. 2, when the step-up ratio (VL/VH=k) is 0.5, the ripple amplitude ILpp reaches the maximum level with respect to the step-up ratio (VL/VH). Further, in the converter 21, since the voltage VH after boosting is equal to or larger than the voltage VL before boosting, (VL≤VH), 0<k≤1 is established for the step-up ratio VL/VH (=k). In a case where the step-up ratio is 1, the ripple amplitude ILpp is at the minimum level (value 0).

As can be seen from the equations (1) and (2), the ripple amplitude ILpp decreases as the carrier frequency fc increases. In a case where the carrier frequency fc is set between a lower limit fcmin and an upper limit fcmax, as denoted by line 305 in FIG. 3, the ripple amplitude ILpp is at the maximum level with respect to the carrier frequency fc when the carrier frequency fc is the lower limit fcmin. On the other hand, when the carrier frequency fc reaches the upper limit fcmax, the ripple amplitude ILpp reaches the minimum level with respect to the carrier frequency fc.

As described above, the ripple amplitude ILpp is at the maximum level under the conditions regarding the step-up ratio (VL/VH) and the carrier frequency fc, that the step-up ratio (VL/VH) is 0.5 and the carrier frequency fc reaches fcmin. Hereinafter, this condition is also referred to as a "maximized ripple amplitude condition".

On the other hand, the ripple amplitude ILpp is at the minimum level (that is, 0) with respect to the step-up ratio (VL/VH) under the condition that the step-up ratio (VL/VH) is 1. Hereinafter, this condition is also referred to as a "minimized ripple amplitude condition".

The temperature rise amount of the converter 21 is related to an amount of heat generated in the reactor L1. This amount of generated heat is related to the square of the current IL. The current IL is composed of a DC component and a ripple component. Therefore, even in a case where the DC component of the current IL is kept at the same value, the amount of generated heat increases as the ripple amplitude ILpp representing the ripple component of the current IL increases, and thus the temperature rise amount also increases. As described above, the temperature rise amount depends on the ripple amplitude ILpp.

The ripple amplitude ILpp is a function of the step-up ratio (VL/VH) of the converter 21 and the carrier frequency fc of the converter 21 as shown in the equation (2). Therefore, the temperature rise amount of the converter 21 depends on the step-up ratio (VL/VH) of the converter 21 and the carrier frequency fc of the converter 21.

Figure 4:
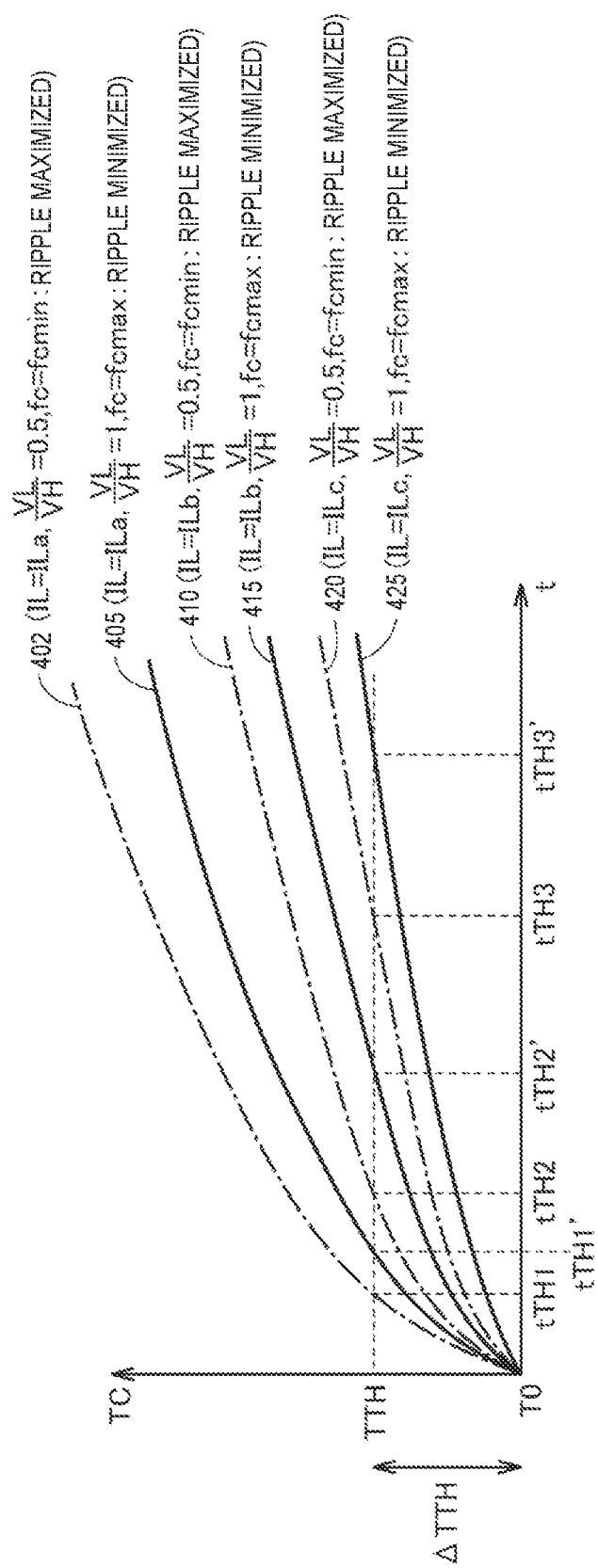
FIG. 4 is a diagram illustrating a temporal transition of a converter temperature TC according to the step-up ratio and the carrier frequency.

Referring to FIG. 4, details of a temperature rise of the converter 21 depending on the step-up ratio of the converter 21 and the carrier frequency of the converter 21 will be described.

FIG. 4 is a diagram illustrating a temporal transition of a temperature TC of the converter 21 according to the step-up ratio (VL/VH) and the carrier frequency (fc). In FIG. 4, a horizontal axis represents a time t elapsed from a time when the temperature TC is an initial temperature T0, and a vertical axis represents the temperature TC of the converter 21.

Referring to FIG. 4, dashed-dotted lines 402, 410, and 420 denote the temporal transition of the temperature TC under the maximized ripple amplitude condition in a case where the current IL is Ia, Ib, or Ic, respectively. Since the temperature rise amount of the converter 21 increases as the ripple amplitude ILpp increases, an amount of the ripple amplitude ILpp contributing to the temperature rise amount of the converter 21 reaches a maximum under the maximized ripple amplitude condition.

Meanwhile, solid lines 405, 415, and 425 denote the temporal transition of the temperature TC under the minimized ripple amplitude condition in a case where the current IL is Ia, Ib, or Ic, respectively. Since the temperature rise amount of the converter 21 decreases as the ripple amplitude ILpp decreases, an amount of the ripple amplitude ILpp contributing to the temperature rise amount of the converter 21 reaches a minimum under the minimized ripple amplitude condition A threshold temperature TTH is appropriately predetermined by, for example, experiments in order to protect the converter 21 from overheating. The threshold temperature TTH is determined based on, for example, the amount of heat generated in the reactor L1 as well as specific heat capacities and operating temperature limits of the components constituting the converter 21.

A time tTH1, tTH2, or tTH3 is a time taken for the temperature TC to reach the threshold temperature TH from the predetermined initial temperature T0 under the maximized ripple amplitude condition in a case where the current IL is kept at Ia, Ib, or Ic, respectively. Hereinafter, the time required for the temperature TC to reach the threshold temperature TH from the predetermined initial temperature T0 is also referred to as a "threshold arrival time". The threshold arrival time is also a time required for the temperature rise amount from the initial temperature T0 of the converter 21 to reach ΔTTH. Further, the initial temperature T0 is determined in advance, for example.

A time tTH1', tTH2', or tTH3' is a threshold arrival time under the minimized ripple amplitude condition in a case where the current IL is kept at Ia, Ib, or Ic, respectively.

When the temperature TC of the converter 21 reaches the threshold temperature TH, the converter current suppression control is executed in order to prevent the converter 21 from being overheated due to the heat generated by the reactor L1.

As one example of the converter current suppression control, control is executed to set the charging upper limit Win and the discharging upper limit Wout of the battery 11 to be lower than those immediately before the threshold arrival time elapses. For example, in a case where the discharging upper limit Wout is set to be lower, and the electric power discharged from the battery 11 to acquire the torque of MG 3 according to a torque command value is equal to or larger than the discharging upper limit set to be lower, the motor ECU 4 controls the inverter 23 such that the torque of the MG 3 is limited in order to restrict the electric power discharged from the battery 11. Consequently, the electric power supplied to the converter 21 is limited as compared with the electric power before the threshold arrival time elapses, thus the current IL flowing through the converter 21 is suppressed. Therefore, the converter 21 is prevented from being overheated.

As shown in the drawings, even in a case where the detected value of the current IL is kept at the same value, the threshold arrival time varies depending on the step-up ratio (VL/VH) and the carrier frequency fc. For example, referring to lines 402 and 405, even when the detected value of the current IL is kept at the same Ia, the step-up ratio (VL/VH) in a case denoted by line 405 is 1 in which the ripple amplitude ILpp reaches the minimum level (see FIG.

Figure 3:
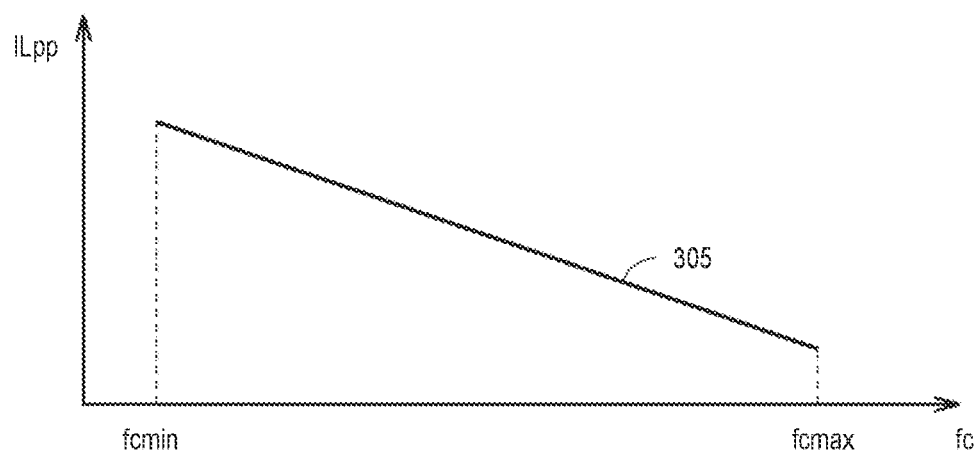
FIG. 3 is a diagram illustrating a correlation between the ripple amplitude of the current flowing through the reactor and a carrier frequency of a converter.

2), and the step-up ratio (VL/VH) in a case denoted by line 402 is 0.5 in which the ripple amplitude ILpp reaches the maximum level (see FIG. 2). The carrier frequency fc in a case denoted by line 405 is larger than the carrier frequency fc in a case denoted by line 402 (FIG. 3).

Therefore, the ripple amplitude ILpp in a case denoted by line 405 is smaller than the ripple amplitude ILpp in a case denoted by line 402. The smaller the ripple component, the smaller the temperature rise amount of the converter 21, thus the temperature rise amount of the converter 21 per unit time in a case denoted by line 405 is smaller than the temperature rise amount in a case denoted by line 402. Therefore, tTH1' as the threshold arrival time in a case denoted by line 405 is longer than tTH1 as the threshold arrival time in a case denoted by line 402.

As described above, the threshold arrival time varies depending on the ripple amplitude ILpp (specifically, the step-up ratio and the carrier frequency fc). Meanwhile, the current sensor 210 cannot accurately detect the ripple component of the current IL.

If the temperature rise amount of the converter 21 is estimated under the assumed conditions that the ripple component of the current IL is not accurately detected and the maximized ripple amplitude condition is always satisfied, it leads to the excessive protection of the converter 21.

For example, in a case where the conditions stated above do not accurately reflect the actual ripple amplitude ILpp, the converter current suppression control may be executed at an unnecessarily early timing. In particular, the unnecessarily early timing indicates that the control is executed when the temperature TC of the converter 21 has not actually risen to the threshold temperature TH and the control does not need to be executed yet.

As the converter current suppression control, for example, when the charging upper limit Win and the discharging upper limit Wout of the battery 11 are set to be lower than those immediately before the threshold arrival time elapses, the torque of the MG 3 is likely to be restricted after the threshold arrival time has elapsed. In this case, traveling performance of the vehicle 10 deteriorates. It is preferable that the control be executed as late as possible to the extent that the converter 21 is protected from overheating.

In the present embodiment, the control (converter current suppression control) of protecting the converter 21 from overheating is executed in a situation in which the step-up ratio (VL/VH) and the carrier frequency fc are taken into consideration, unlike a case where the converter 21 is protected under the assumed condition that the maximized ripple amplitude condition is always satisfied.

Figure 5:
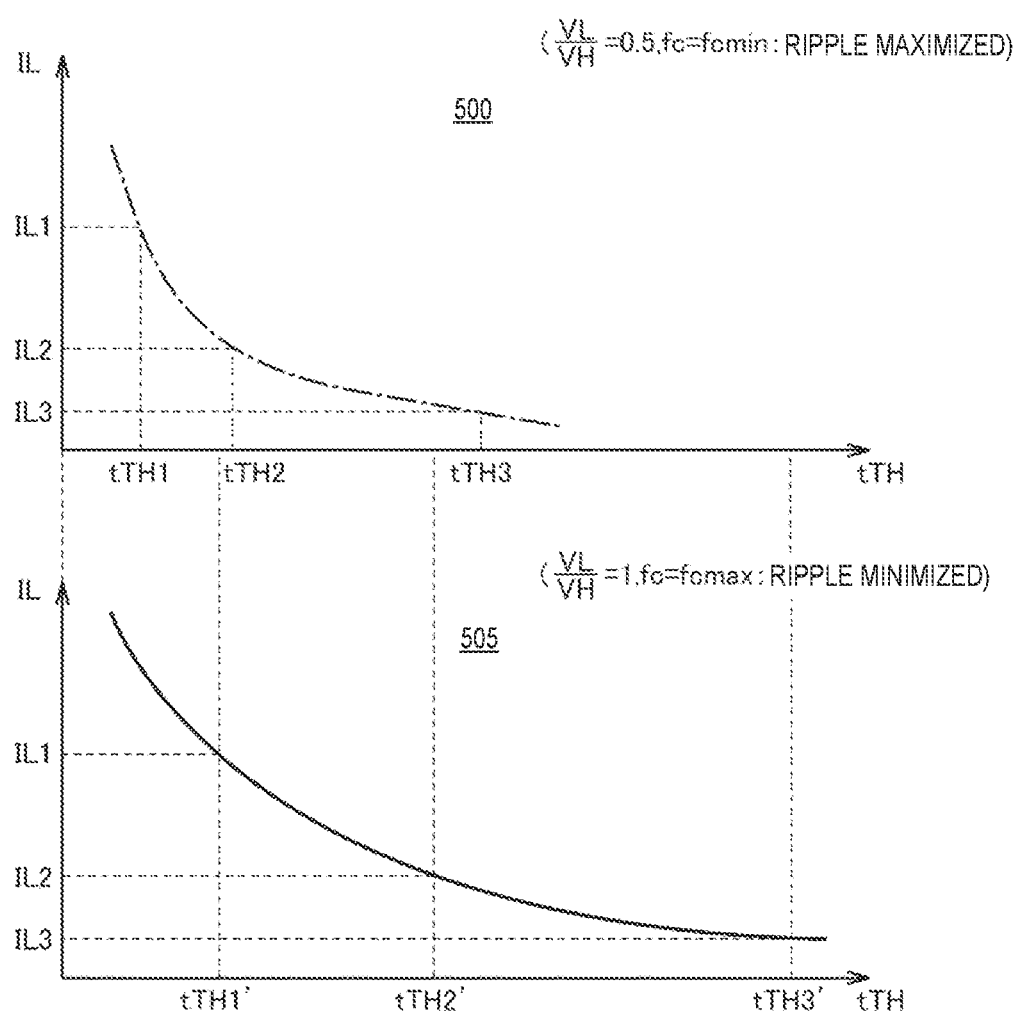
FIG. 5 is a diagram illustrating maps each showing a correlation between a detected value of the current flowing through the reactor and a threshold arrival time.

Referring to FIG. 5, a difference in the threshold arrival time, between a case where the ripple amplitude ILpp reaches the maximum level and a case where the ripple amplitude ILpp is at the minimum level, will be described in more detail.

FIG. 5 is a diagram illustrating maps 500, 505 respectively showing a correlation between the detected value of the current IL and the threshold arrival time. In upper and lower rows of FIG. 5, a vertical axis represents the detected value of the current IL, and a horizontal axis represents the threshold arrival time shown in FIG. 4. The maps 500, 505 are predetermined by, for example, experiments, and stored in advance in the memory 5 (see FIG. 1) of the motor ECU 4.

Referring to the upper row of FIG. 5, the map 500 shows the threshold arrival time when the detected value of the current IL keeps being obtained under the maximized ripple amplitude condition. The map 500 also represents the threshold arrival times tTH1, tTH2, and tTH3 shown in relation to lines 402, 410, and 420 (see FIG. 4), respectively.

Meanwhile, referring to the lower row of FIG. 5, the map 505 shows the threshold arrival time when the detected value of the current IL keeps being obtained under the minimized ripple amplitude condition. The map 505 also represents the threshold arrival times tTH1', tTH2', and tTH3' shown in relation to lines 405, 415, and 425 (see FIG. 4), respectively.

As described above, the maps 500, 505 respectively define the correlation between the detected value of the current IL and the threshold arrival time, according to the step-up ratio (VL/VH) and the carrier frequency fc of the converter 21. Additionally, the memory 5 further stores a plurality of other maps (not shown) that predefine the correlation according to other combinations of the step-up ratio (VL/VH) and carrier frequency fc.

It is possible to simplify the configuration for the control of protecting the converter from overheating by using the maps prepared in advance by, for example, experiments.

The motor ECU 4 selects a map corresponding to the step-up ratio (VL/VH) and the carrier frequency fc of the converter 21, from the maps 500, 505, as well as other maps, stored in the memory 5. The motor ECU 4 selects the map 500, for example, in a case where the step-up ratio (VL/VH) is 0.5 and the carrier frequency fc is fcmin. Further, the motor ECU 4 selects the map 505, for example, in a case where the step-up ratio (VL/VH) is 1 and the carrier frequency fc is fcmax.

The motor ECU 4 acquires the threshold arrival time tTH corresponding to the detected value of the current IL, based on the detected value and the selected map. For example, in a case where the detected value is IL1 and the map 505 is selected, the threshold arrival time tTH in a case where the detected value keeps being obtained is tTH1'. The threshold arrival time tTH acquired according to the map thus selected is used for estimating the temperature rise amount of the converter 21 as described below.

A method for estimating the temperature rise amount of the converter 21 according to the acquired threshold arrival time tTH will be described referring to FIG. 6.

FIG. 6 is a diagram illustrating a table 600 showing a correlation between the detected value of the current IL and the temperature rise amount $\Delta TC$ of the converter 21. In particular, a table 600 stores the correlation in a case where the step-up ratio (VL/VH) is VLa/VHa and the carrier frequency fc is fca. The table 600 is stored in advance in the memory 5 of the motor ECU 4. The table 600 includes columns 605, 610, and 615. The column 605 represents the detected value of the current IL.

The column 610 represents the threshold arrival time tTH corresponding to the detected value. The threshold arrival time is a threshold arrival time in a case where the detected value keeps being obtained. As illustrated referring to FIG. 5, the threshold arrival time tTH is a function of the step-up ratio (VL/VH) and the carrier frequency fc, because it varies depending on those factors.

The column 610 represents the threshold arrival time tTH in a case where the step-up ratio (VL/VH) is VLa/VHa and the carrier frequency fc is fca. For example, in a case where the detected value of the current IL is IL1, the threshold arrival time tTH in a case where the detected value keeps being obtained is tTH11. In a case where (VLa/VHa) is 0.5 and fca is fcmin (maximized ripple amplitude condition), tTH11 is tTH1 (see FIG. 4). Further, in a case where (VLa/VHa) is 1 (minimized ripple amplitude condition), tTH11 is tTH1' (see FIG. 4).

The column 615 represents the temperature rise amount ΔTC of the converter 21 according to the threshold arrival time tTH corresponding to the current IL. The temperature rise amount is the temperature rise amount of the converter 21 over a sampling cycle from a sampling timing of the detected value of the current sensor 210 to the next sampling timing. Since the temperature rise amount ΔTC is calculated based on the threshold arrival time tTH as described below, it is a function of the step-up ratio (VL/VH) and the carrier frequency fc as in the threshold arrival time tTH. The column 615 represents the temperature rise amount ΔTC estimated in a case where the step-up ratio (VL/VH) is VLa/VHa and the carrier frequency fc is fca.

The detected value of the current sensor 210 is acquired by the motor ECU 4 in a sampling cycle TS. The temperature TC of the converter 21 rises due to heat generated by the reactor L1 over the sampling cycle TS from such a sampling timing to the next sampling timing. The correlation between the sampling cycle TS and the temperature rise amount ΔTC of the converter 21 over the sampling cycle TS is the same as the correlation between the threshold arrival time tTH in a case where a certain detected value of the current IL keeps being obtained, and ΔTTH (see FIG. 4) as the total temperature rise amount of the converter 21 when the threshold value arrival time has elapsed.

In the example shown in FIG. 6, in a case where the detected value of the current IL is IL1, the threshold arrival time tTH is tTH11 when IL1 keeps being obtained as the detected value. A temperature rise rate indicating how much the temperature TC has increased from the initial temperature T0 with respect to the threshold temperature TTH (see FIG. 4 for both) is expressed as a percentage.

For example, when the temperature TC has not yet risen from the initial temperature T0, the temperature rise rate of the converter 21 is 0%. When the temperature TC has risen to an average temperature of the initial temperature T0 and the threshold temperature TTH, the temperature rise rate is 50%. When the temperature TC has risen to the threshold temperature TTH, the temperature rise rate is 100%.

Therefore, how much the temperature TC has risen for each sampling cycle TS is also expressed in a percentage. For example, in a case where IL1 keeps being obtained as the detected value of the current IL, the temperature rise rate over the time interval of tTH11 is 100%. Therefore, in a case where the detected value of the current IL is IL1, the temperature rise rate over the sampling cycle TS from the sampling timing of the detected value to the next sampling timing is estimated to be (TS/tTH11)×100(%).

Therefore, the temperature rise amount over the sampling cycle TS is estimated to be (TS/tTH11)×100×ΔTTH, based on the total temperature rise amount (ΔTTH) (see FIG. 4) of the converter 21 from the time when the temperature TC is the initial temperature T0 to the time when the threshold arrival time tTH has elapsed, and the temperature rise rate. Even in a case where the detected value of the current IL is the other value (for example, IL2 or IL3), the temperature rise amount ΔTC over the sampling cycle TS is similarly estimated (see the column 615).

In addition to the table 600, the memory 5 also includes tables such as tables 620, 630 for calculating the temperature rise amount ΔTC in a case where other combinations are taken as the step-up ratio (VL/VH) and the carrier frequency fc.

For example, the table 620 is a table for calculating the temperature rise amount ΔTC over the sampling cycle TS when the step-up ratio (VL/VH) is VLb/VHb and the carrier frequency fc is fcb. The table 630 is a table for calculating the temperature rise amount ΔTC over the sampling cycle TS when the step-up ratio (VL/VH) is VLc/VHc and the carrier frequency fc is fcc.

The motor ECU 4 estimates the temperature rise amount ΔTC over the sampling cycle TS from the sampling timing to the next sampling timing according to the detected value of the current sensor 210 at the sampling timing. The temperature rise amount ΔTC is different from the temperature rise amount estimated under the assumption that the maximized ripple amplitude condition is always satisfied, and reflects the actual step-up ratio (VL/VH) and the carrier frequency fc, of the converter 21, at the sampling timing.

It is estimated that the temperature TC of the converter 21 reaches the threshold temperature TH at a timing when an integrated value of the temperature rise amount ΔTC of the converter 21 reaches ΔTTH (see FIG. 4) as the threshold, thus the converter current suppression control is executed. The integrated value is the integrated value of the temperature rise amount ΔTC integrated from the time when the temperature TC is the initial temperature T0.

Since the converter current suppression control is executed as stated above, the timing at which the current (current IL) flowing through the converter 21 is suppressed is not unnecessarily advanced, unlike the timing calculated under the maximized ripple amplitude condition. In other words, it is possible to delay the timing at which the converter current suppression control is executed (timing at which the traveling performance of the vehicle 10 deteriorates) compared to the timing calculated under the condition, within a range in which the converter 21 is protected from overheating.

Figure 7:
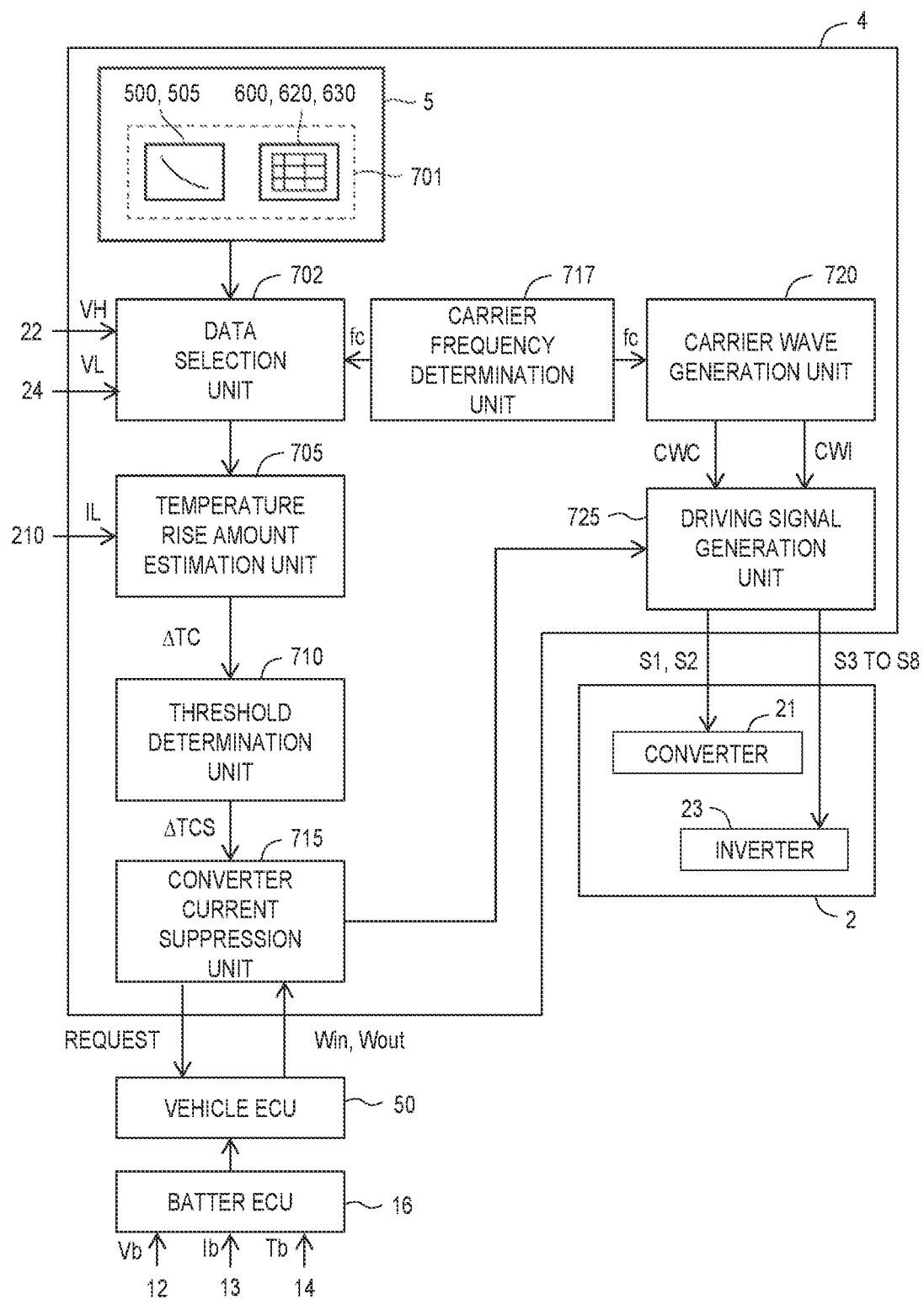
FIG. 7 is a functional block diagram of a motor ECU.

FIG. 7 is a functional block diagram of the motor ECU 4. The motor ECU 4 includes a data selection unit 702, a temperature rise amount estimation unit 705, a threshold determination unit 710, a converter current suppression unit 715, a carrier frequency determination unit 717, a carrier wave generation unit 720, and a driving signal generation unit 725.

The data selection unit 702 receives the voltage VH and the voltage VL, respectively output from the voltage sensor 22 and the voltage sensor 24. Further, the data selection unit 702 receives the carrier frequency fc output from the carrier frequency determination unit 717. The data selection unit 702 selects data corresponding to the step-up ratio (VL/VH) calculated from the voltage VL and the voltage VH, and corresponding to the carrier frequency fc, from among temperature rise amount estimation data 701 stored in the memory 5, according to the step-up ratio and the carrier frequency.

The temperature rise amount estimation data 701 is data that defines a predetermined correlation between the detected value of the current IL, the step-up ratio (VL/VH) and the carrier frequency fc, and the temperature rise amount ΔTC of the converter 21. In particular, the temperature rise amount estimation data 701 is composed of a plurality of maps (including, for example, the maps 500, 505 shown in FIG. 5) and a plurality of tables (for example, including the tables 600, 620, and 630 shown in FIG. 6).

For example, in a case where the step-up ratio is 0.5 and the carrier frequency fc is fcmin, the data selection unit 702 selects the map 500 (see FIG. 5) corresponding to a combination of the step-up ratio and the carrier frequency. In this case, the data selection unit 702 selects the table (see FIG. 6) corresponding to the combination of the step-up ratio and the carrier frequency. The map and the table, selected by the data selection unit 702, are output to the temperature rise amount estimation unit 705.

Using the data (map and table) selected by the data selection unit 702, the temperature rise amount estimation unit 705 estimates the temperature rise amount $\Delta TC$ of the converter 21 over the sampling cycle TS (see FIG. 6) from the sampling timing of the detected value to the next sampling timing, according to the detected value of the current IL. The estimated temperature rise amount $\Delta TC$ is output to the threshold determination unit 710.

The threshold determination unit 710 determines whether or not the integrated value $\Delta TCS$ of the temperature rise amount $\Delta TC$ is equal to or larger than $\Delta TTH$ (see FIG. 4) as the threshold. When the integrated value $\Delta TCS$ is $\Delta TTH$ or larger, the threshold determination unit 710 outputs a request to the converter current suppression unit 715 so as to execute the converter current suppression control.

Upon receiving the request, the converter current suppression unit 715 executes control for suppressing the current IL in order to protect the converter 21 from overheating. The current IL is suppressed based on the charging upper limit Win and the discharging upper limit Wout transmitted from the vehicle ECU 50 as described below.

Upon receiving the request from the threshold determination unit 710, the converter current suppression unit 715 outputs a request to the vehicle ECU 50 to set the charging upper limit Win and the discharging upper limit Wout to be lower than those immediately before the threshold arrival time elapses.

Upon receiving the request, the vehicle ECU 50 determines the charging upper limit Win and the discharging upper limit Wout, which are smaller, after the threshold arrival time has elapsed. These upper limit values are determined based on the information indicating a state of the battery 11 such as the SOC and the temperature Tb of the battery 11, transmitted from the battery ECU 16. The vehicle ECU 50 transmits, to the converter current suppression unit 715, the charging upper limit Win and the discharging upper limit Wout after the threshold arrival time has elapsed.

Upon receiving the charging upper limit Win and the discharging upper limit Wout, which are smaller, after the threshold arrival time has elapsed, from the vehicle ECU 50, the converter current suppression unit 715 generates a voltage command value for the inverter 23 according to these upper limit values, and outputs the generated voltage command value to the driving signal generation unit 725.

The driving signal generation unit 725 compares the voltage command value with a carrier wave CWI generated by the carrier wave generation unit 720. The carrier wave CWI is used for PWM control of the inverter 23, and is generated based on a carrier frequency (not shown) for the inverter 23.

Then, the driving signal generation unit 725 generates PWM signals of which logical states change according to the comparison result, as the driving signals S3 to S8. The driving signal generation unit 725 outputs the generated driving signals S3 to S8 to the switching elements Q3 to Q8 (see FIG. 1) of the inverter 23, respectively.

The driving signal generation unit 725 also compares a carrier wave CWC generated by the carrier wave generation unit 720 based on the carrier frequency fc for the converter 21 with a command value of the voltage VH. PWM signals of which logical states change based on the comparison result are generated as driving signals S1 and S2. The switching elements Q1 and Q2 (see FIG. 1) of the converter 21 are driven according to the driving signals S1 and S2.

As described above, the inverter 23 is controlled according to the charging upper limit Win and the discharging upper limit Wout. Consequently, a regenerative torque of the MG 3 is limited when the vehicle 10 is braked, and a power running torque of the MG 3 is restricted when the vehicle 10 is running. Therefore, the electric power supplied to the positive electrode lines PL1 and PL2 and the negative electrode line NL (see FIG. 1) is also limited, thus the current IL is suppressed. Accordingly, the converter 21 is protected from overheating.

Figure 8:
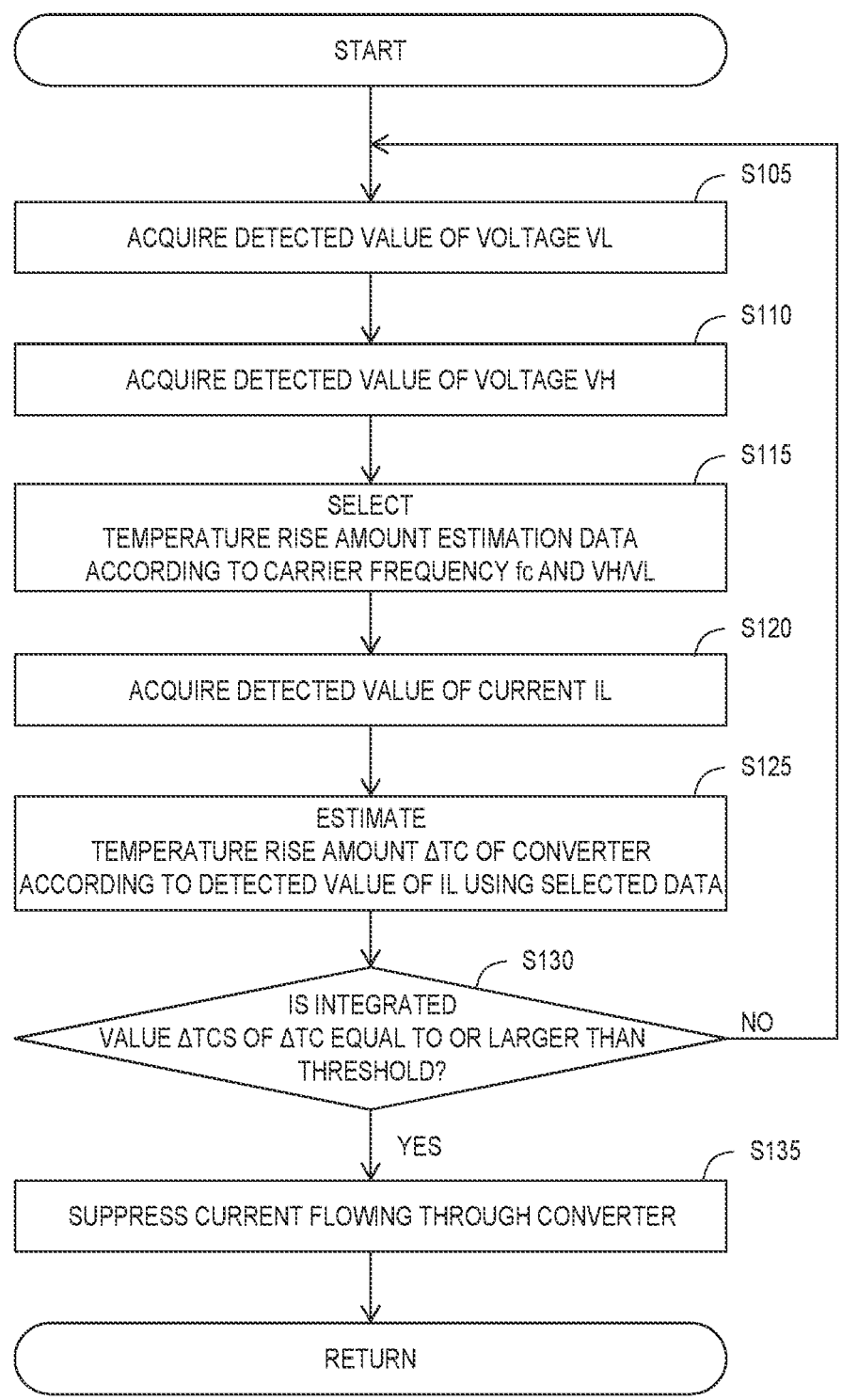
FIG. 8 is a diagram illustrating one example of a process executed by the motor ECU.

FIG. 8 is a diagram illustrating one example of a process executed by the motor ECU 4. This flowchart is executed at predetermined intervals. Each sensor value is sampled for each cycle.

The motor ECU 4 acquires the detected value of the voltage VL from the voltage sensor 24 (S105), and acquires the detected value of the voltage VH from the voltage sensor 22 (S110). The motor ECU 4 selects the temperature rise amount estimation data 701 (see FIG. 7) according to the carrier frequency fc and the step-up ratio (VH/VL) (S115).

The motor ECU 4 acquires the detected value of the current IL from the current sensor 210 (S120). Using the carrier frequency fc, the step-up ratio (VH/VL), and the selected temperature rise amount estimation data 701, the motor ECU 4 estimates the temperature rise amount $\Delta TC$ of the converter 21 over the sampling cycle TS (see FIG. 6) from the sampling timing of the detected value to the next sampling timing, according to the detected value of the current IL (S125).

The motor ECU 4 determines whether the integrated value $\Delta TCS$ of the temperature rise amount $\Delta TC$ (see FIG. 7) is equal to or larger than $\Delta TTH$ (see FIG. 4) as the threshold (S130). In a case where the integrated value $\Delta TCS$ of the temperature rise amount $\Delta TC$ is $\Delta TTH$ or larger (YES in S130), the motor ECU 4 proceeds to step S135. If otherwise (NO in S130), the motor ECU 4 returns the process to step S105.

In step S135, the motor ECU 4 executes the control for suppressing the current flowing through the converter 21 as the control for protecting the converter 21. In particular, the motor ECU 4 outputs the request to the vehicle ECU 50 to set the charging upper limit Win and the discharging upper limit Wout, of the battery 11, to be lower than those immediately before the threshold arrival time elapses. Accordingly, the charging upper limit Win and the discharging upper limit Wout become smaller, and thus the current IL is suppressed. The motor ECU 4 then returns the process.

Figure 9:
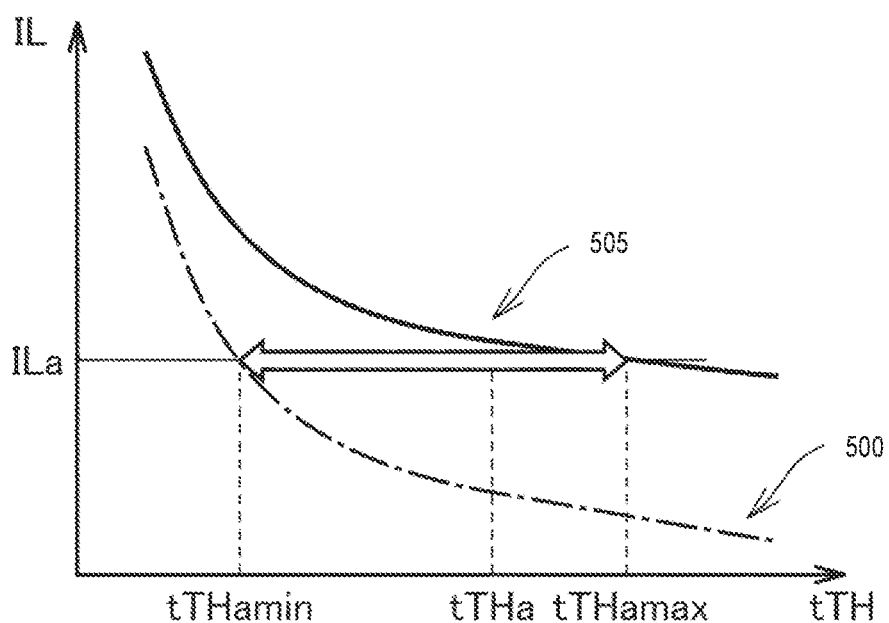
FIG. 9 is a diagram illustrating a timing at which converter current suppression control is executed in the present embodiment.

FIG. 9 is a diagram illustrating a timing at which the converter current suppression control is executed in the present embodiment. In FIG. 9, as in a case shown in FIG. 5, a vertical axis represents the detected value of the current IL, and a horizontal axis represents the threshold arrival time tTH. The maps 500, 505 of FIG. 5 are also shown.

A motor ECU of a comparative example estimates the temperature rise amount of the converter over each sampling cycle using the map 500 under the assumption that the maximized ripple amplitude condition is always satisfied. On the other hand, the motor ECU 4 of the present embodiment estimates the temperature rise amount $\Delta TC$ of the converter 21 over each sampling cycle using the map 505 considering the step-up ratio (VL/VH) and the carrier frequency fc, related to the ripple amplitude ILpp.

In the comparative example (map 500), the threshold arrival time tTH is tTHamin in a case where the detected value of the current IL is kept at ILa. tTHamin is the threshold arrival time under the maximized ripple amplitude condition. Under this circumstance, it is assumed that the amount of the ripple amplitude ILpp contributing to the temperature rise amount of the converter 21 is at the maximum level. Therefore, tTHamin is the smallest value that the threshold arrival time tTH can represent to the extent that the step-up ratio (VL/VH) and the carrier frequency fc can change. Consequently, the converter current suppression control may be executed at an unnecessarily early timing, and the traveling performance of the vehicle 10 may be declined at an unnecessarily early timing.

On the other hand, in the present embodiment, even in a case where the detected value of the current IL is kept at ILa, the threshold arrival time tTHa may vary depending on the step-up ratio (VL/VH) and the carrier frequency fc at the sampling timing at which the voltage VL and the voltage VH are detected.

In the present embodiment, the step-up ratio (VL/VH) may not be 0.5 (see FIG. 2) and the carrier frequency fc may not be fcmin (see FIG. 3) until the integrated value ΔTCS of the temperature rise amount ΔTC of the converter 21 reaches the threshold (ΔTTH in FIG. 4). Further, the step-up ratio (VL/VH) and the carrier frequency fc may change for each sampling timing. Therefore, in the present embodiment, the threshold arrival time tTHa falls within a range of tTHamin<tTHa<tTHamax (described later) according to the step-up ratio (VL/VH) and the carrier frequency fc at the sampling timing of the current IL (within a range denoted by a white arrow in the drawing).

Therefore, in the present embodiment, the converter current suppression control is not executed at an unnecessarily early timing, unlike the comparative example in which the threshold arrival time tTH is tTHamin. Accordingly, the traveling performance of the vehicle 10 is not declined at an unnecessarily early timing. In the present embodiment, it is possible to suppress a decrease in drivability within a range in which the converter 21 is protected from overheating.

tTHamax is the threshold arrival time under the minimized ripple amplitude condition. Under this condition, since the ripple amplitude ILpp is 0, the amount of the ripple amplitude ILpp contributing to the temperature rise amount of the converter 21 is at the minimum level (0). Therefore, tTHamax is the largest value that the threshold arrival time tTH can represent to the extent that the step-up ratio (VL/VH) and the carrier frequency fc can change.

Modified Example

Figure 10:
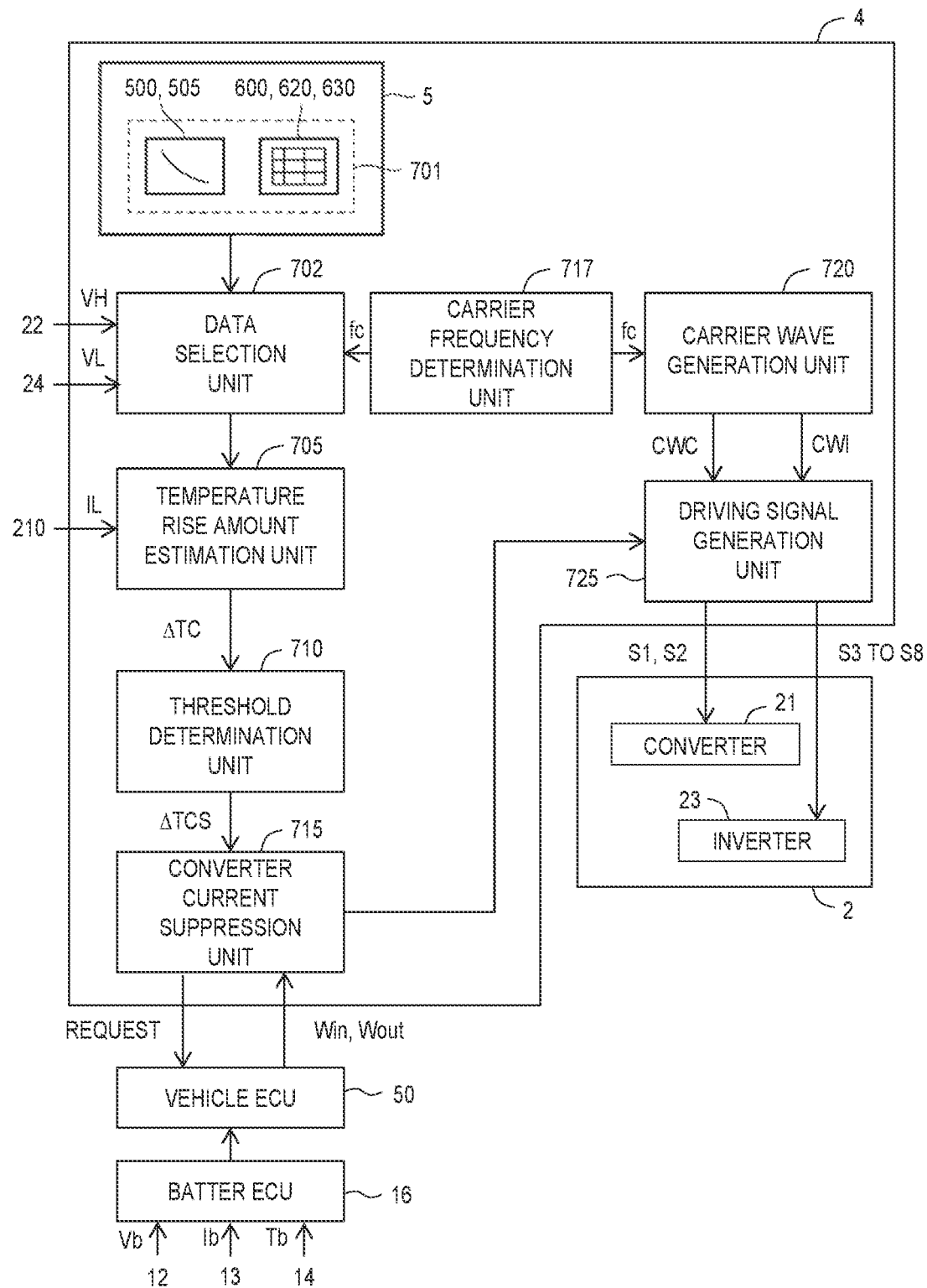
FIG. 10 is a functional block diagram of the motor ECU in a modified example of the present embodiment.

A modified example of the embodiment will be described with reference to FIG. 10. FIG. 10 is a functional block diagram of the motor ECU 4 in the modified example of the present embodiment.

In the embodiment stated above, in a case where the integrated value ΔTCS of the temperature rise amount ΔTC reaches the threshold, the converter current suppression unit 715 outputs the request to the vehicle ECU 50 to limit the charging upper limit Win and the discharging upper limit Wout.

On the other hand, in the modified example of the embodiment, the converter current suppression unit 715 outputs a command to the carrier frequency determination unit 717 such that the carrier frequency fc of the converter 21 is set to be higher than that immediately before the integrated value ΔTCS reaches the threshold, in the same circumstance. Consequently, the ripple amplitude ILpp becomes smaller (see FIG. 2), thus the ripple component of the current IL decreases. Therefore, the current IL is suppressed by the reduction of the ripple component.

In a case where the carrier frequency fc is increased, the carrier frequency determination unit 717 determines the increased carrier frequency fc when receiving the command stated above. The carrier frequency determination unit 717 outputs the increased carrier frequency fc to the data selection unit 702 and the carrier wave generation unit 720.

The carrier wave generation unit 720 generates the carrier wave CWC for the PWM control of the converter 21 based on the increased carrier frequency fc. The driving signal generation unit 725 generates the driving signals S1 and S2 (see FIG. 1) for executing the PWM control of the converter 21 according to the carrier wave CWC after being increased. The converter 21 is driven according to a duty ratio based on the driving signal.

Consequently, the ripple amplitude ILpp of the current IL flowing through the converter 21 becomes smaller than the amplitude before the carrier frequency fc is increased. Therefore, the current IL is suppressed by the reduction of the ripple amplitude ILpp. Since the amount of heat generated in the reactor L1 is reduced, the temperature rise amount of the converter 21 is reduced. Therefore, the converter 21 is protected from overheating. As stated above, in a case where the integrated value ΔTCS of the temperature rise amount ΔTC reaches the threshold, the converter current suppression unit 715 may increase the carrier frequency fc of the converter 21 as compared with the carrier frequency immediately before the integrated value ΔTCS reaches the threshold.

Other Modified Example

In the embodiment stated above, the motor ECU 4 estimates the temperature rise amount ΔTC of the converter 21 according to the step-up ratio (VL/VH) and the carrier frequency fc of the converter 21. On the other hand, the motor ECU 4 may estimate the temperature rise amount ΔTC of the converter 21 according to any one of the step-up ratio (VL/VH) and the carrier frequency fc of the converter 21.

In such a case, the temperature rise amount estimation data 701 defines the predetermined correlation between the detected value of the current IL and the temperature rise amount ΔTC of the converter 21, according to any one of the step-up ratio (VL/VH) and the carrier frequency fc, of the converter 21. For example, the temperature rise amount estimation data 701 defines the correlation for each of the step-up ratio (VL/VH) and the carrier frequency fc of the converter 21.

The motor ECU 4 selects data corresponding to any one of the step-up ratio (VL/VH) and the carrier frequency fc of the converter 21, from among the temperature rise amount estimation data 701. Using the selected data corresponding to any one of the step-up ratio (VL/VH) and the carrier frequency fc, the motor ECU 4 estimates the temperature rise amount ΔTC of the converter 21 over the sampling cycle TS from the sampling timing of the detected value to the next sampling timing, according to the detected value of the current IL.

In the embodiment stated above, the current IL is employed as the current flowing through the converter 21, but the present disclosure is not limited thereto. For example, the current Ib flowing through the battery 11 may be employed instead of the current IL. In this case, the current sensor 210 may not be provided, and the motor ECU 4 estimates the temperature rise amount ΔTC of the converter 21 according to the detected value of the current sensor 13 transmitted via the battery ECU 16 and the vehicle ECU 50.

In the embodiment stated above, the motor ECU 4 includes the memory 5, but the memory 5 may be provided as a component separately from the motor ECU 4.

In the embodiment and its modified examples, the motor ECU 4 and the vehicle ECU 50 correspond to the exemplified "control device" of the present disclosure. Further, the PCU 2 and the vehicle ECU 50 correspond to the exemplified "power conversion system" of the present disclosure.

The embodiments disclosed are to be considered as illustrative and not restrictive. The scope of the present disclosure is defined by the terms of the claims, rather than the description stated above, and includes any modifications within the scope and meanings equivalent to the terms of the claims.

What is claimed is:

1. A power conversion system comprising:
   a converter configured to boost a voltage by operating at a set carrier frequency;
   a current sensor configured to detect a current flowing through the converter; and
   a processor configured to execute control for protecting the converter, wherein the processor is configured to:
   acquire a carrier frequency of the converter, and a voltage ratio before and after boosting by the converter,
   estimate a threshold arrival time according to the detected current of the current sensor, the carrier frequency, and the voltage ratio and estimate a total temperature rise amount according to the threshold arrival time corresponding to the detected current,
   estimate a temperature rise amount of the converter over a sampling cycle according to the detected current of the current sensor, the carrier frequency, and the voltage ratio, and
   execute control for suppressing the current flowing through the converter in a case where an integrated value of the temperature rise amount reaches the total temperature rise amount.

2. The power conversion system according to claim 1, further comprising:
   a memory configured to store predetermined correlations between the temperature rise amount, the detected current of the current sensor, and the at least one of the carrier frequency or the voltage ratio,
   wherein the processor is configured to select, from the predetermined correlations, data corresponding to a correlation between the acquired voltage ratio and the acquired carrier frequency, and estimate the temperature rise amount according to the detected current of the current sensor, using the selected data.

3. The power conversion system according to claim 1, wherein the processor is configured to set, in a case where the integrated value reaches the total temperature rise amount, the carrier frequency to be higher than a carrier frequency immediately before the integrated value reaches the total temperature rise amount.

4. The power conversion system according to claim 1, wherein:
   the converter is electrically connected between a power storage device and a load device;
   the processor is configured to control the load device such that electric power input to and output from the power storage device is respectively limited to a charging upper limit and a discharging upper limit of the power storage device, and set, in a case where the integrated value reaches the total temperature rise amount, the charging upper limit and the discharging upper limit to be lower than a charging upper limit and a discharging upper limit immediately before the integrated value reaches the total temperature rise amount.

5. The power conversion system according to claim 1, wherein the temperature rise amount of the converter is estimated according to the detected current of the current sensor, the carrier frequency, and the voltage ratio before and after boosting by the converter.

6. The power conversion system according to claim 2, wherein the estimated temperature rise amount over the sampling cycle is expressed in a percentage based on the total temperature rise amount.

* * * * *